March 10, 1942.                    J. MIHALYI                    2,275,791
DOUBLE EXPOSURE PREVENTION
Filed March 12, 1940                                    2 Sheets-Sheet 1
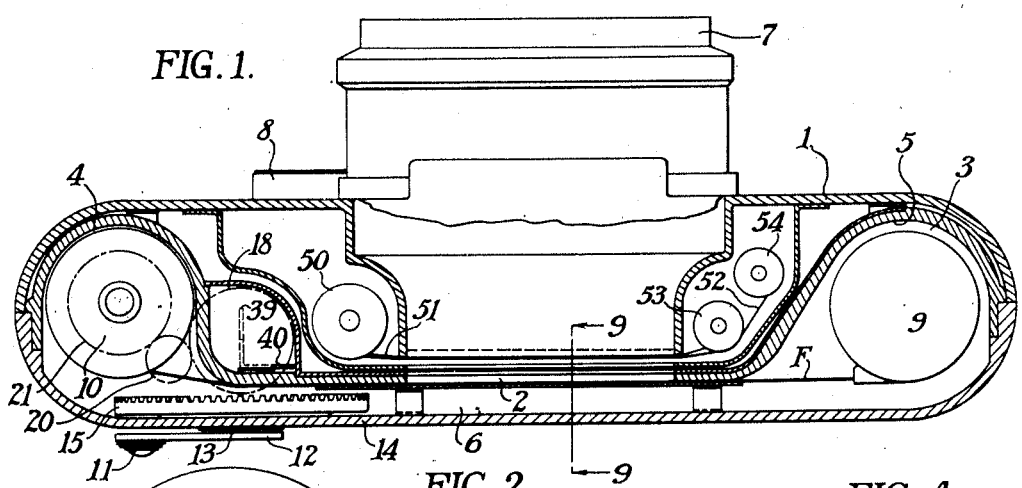
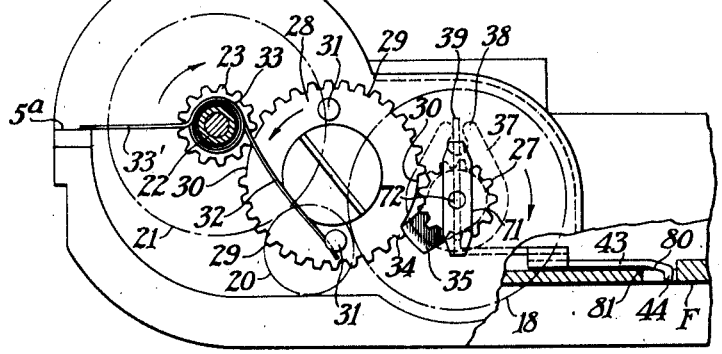
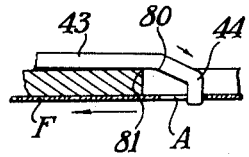
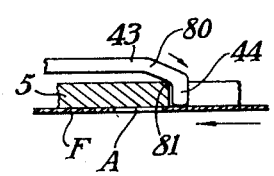
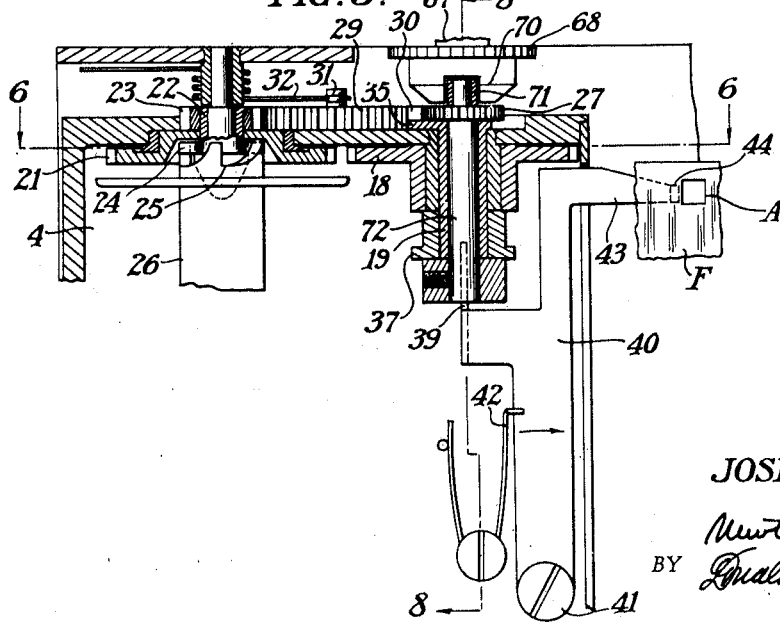
JOSEPH MIHALYI
INVENTOR
BY
ATTORNEYS

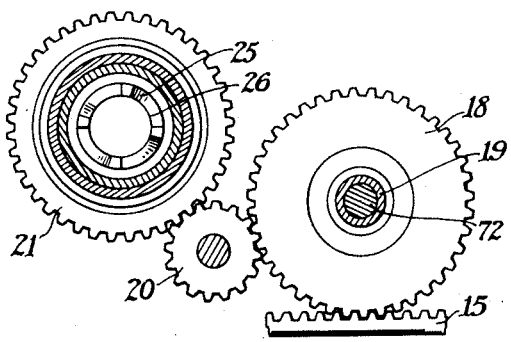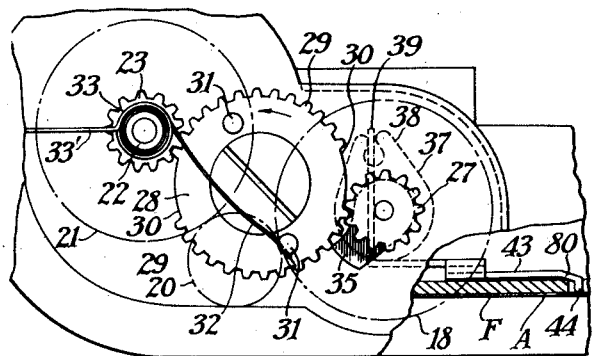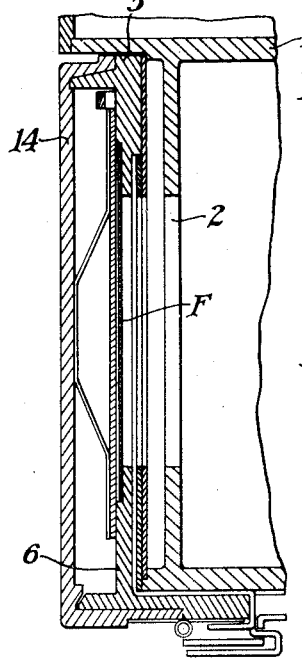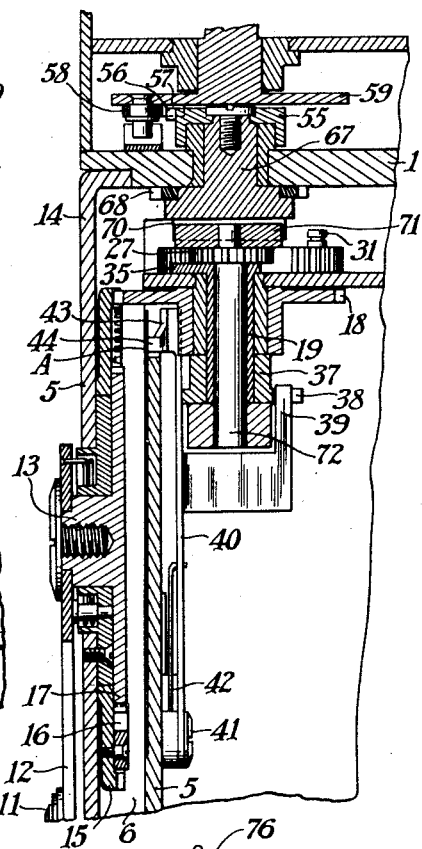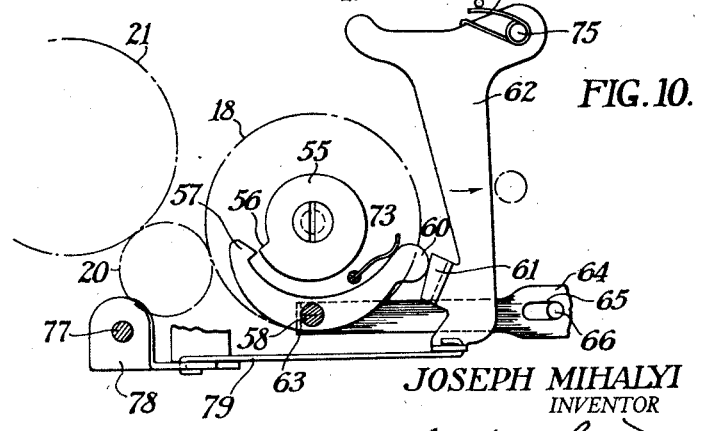

Patented Mar. 10, 1942

2,275,791

UNITED STATES PATENT OFFICE 2,275,791

DOUBLE EXPOSURE PREVENTION

Joseph Mihalyi, Rochester, N. Y., assignor to Eastman Kodak Company, Rochester, N. Y., a corporation of New Jersey Application March 12, 1940, Serial No. 323,603

10 Claims. (Cl. 95—31)

This invention relates to photography and more particularly to photographic cameras.

One object of my invention is to provide a camera with a mechanism which will prevent double exposures. Another object of my invention is to provide a roll film camera structure which is adapted to simultaneously wind a film area into place for exposure and tension the shutter spring, the duration of the winding movement being controlled by the film. Another object of my invention is to provide a camera with a mechanism operable by film perforations for controlling the film winding operation, and other objects will appear from the following specification, the novel features being particularly pointed out in the claims at the end thereof.

My present invention is particularly adapted for use on cameras for using the so-called miniature film and for cameras in which the film may be carried by magazines which are detachably carried by a camera body so that magazines carrying different types of film may be readily used for different exposures. Certain features of the invention are particularly adapted for use on cameras of the type shown in my following patents: U. S. Patent No. 2,150,693, "Camera winding device," granted March 14, 1939; U. S. Patent 2,169,001, "Camera shutter setting and film winding mechanism," granted August 8, 1939; and U. S. Patent No. 2,172,337, "Two part roll holding camera," granted September 5, 1939. In the first of these patents, I have described a camera winding mechanism in which the winding handle is mounted on the camera back. The same type of film winding handle is used in accordance with my present invention. In the second mentioned patent, I have shown a camera with a combined film winding and shutter setting mechanism which is in some respects similar to the structure shown in the present application, although for the exact type of shutter, reference should be had to my copending application, Serial No. 231,573, filed September 24, 1938, for "Focal plane shutter construction," resulting in Patent 2,218,248, October 15, 1940. Reference may be had to the above patents and application for the complete details of features not fully described and shown in the present application.

Coming now to the drawings, wherein like reference characters denote like parts throughout:

Fig. 1 is a top plan view, partially in section, of a camera showing a film winding and shutter setting mechanism arranged to prevent double exposure and illustrating a preferred embodiment of my invention. In this view, parts are omitted for the sake of clearness.

Fig. 2 is an enlarged fragmentary end elevation, partially in section, of a portion of a film magazine showing a film winding control embodying a preferred form of my invention.

Fig. 3 is an enlarged fragmentary section, parts being shown in elevation, of the film controlling mechanism, partially shown in Fig. 2.

Figs. 4 and 5 are enlarged fragmentary sectional details of a portion of the latch operating mechanism.

Fig. 6 is a plan view, partially in section, taken on line 6—6 of Fig. 3.

Fig. 7 is an enlarged fragmentary view similar to Fig. 2, but with the parts in a different position.

Fig. 8 is an enlarged fragmentary section taken on line 8—8 of Fig. 3.

Fig. 9 is an enlarged section taken on line 9—9 of Fig. 1.

Fig. 10 is a fragmentary plan view, parts being shown in section, of a portion of the shutter tensioning mechanism.

My present invention consists broadly in the prevention of double exposure by simultaneously winding a film and tensioning the shutter by means of a single handle, the movement of which is limited through the movement of the film itself.

In accordance with a preferred embodiment of my invention, I may provide a camera body 1, having an exposure aperture 2 and having spool chambers to each side of the aperture including a supply spool chamber 3 and a take-up spool chamber 4, both of which may be contained inside of the walls 5 of a roll holder, designated broadly as 6, this roll holder fitting on the camera body 1 in the manner shown in my U. S. Patent 2,172,337. For the purpose of the present invention, it is unnecessary to utilize a separable roll holder, as the spool chambers 3 and 4 may obviously be formed directly in the camera body 1, if desired.

The camera 1 may have the usual objective 7, which may be focussed by a knob 8.

A film F may be led from a retort or supply film spool 9, across the exposure frame 2 and onto a take-up spool 10, this spool being turned by means of a handle 11, carried by the crank arm 12, attached to a shaft 13, passing through the back wall 14 and operating a crown gear 15, through a pawl 16 and ratchet 17, all as fully described in my above mentioned U. S. Patent 2,150,693.

When the crown gear 15 is turned, it meshes with and turns the gear 18 which is freely revoluble on the sleeve shaft 19 and which, as best shown in Fig. 6, meshes with a pinion 20 and a gear 21, the latter, as best shown in Fig. 3, being attached to a sleeve shaft 22, which also carries a pinion 23.

Thus, as the handle 11 is turned, film carried by the spool 10, best shown in Fig. 3, is turned through the engagement of the winding key 24, with the teeth 25 on the end of the spool core 26.

The gear train 18, 20 and 21 is one of two gear trains which is used in this mechanism, this gear train being the film winding gear train.

The film wind control gear train, as shown in Figs. 2 and 7, includes the pinion 23, which, as above explained, turns with the gear 21, and a second pinion 27, which is spaced from pinion 23. In order to connect and disconnect these two pinions, there is a mutilated gear 28 in the form shown, having two sets of teeth 29 spaced apart by two mutilated sections 30. In the present embodiment, the number of teeth 29 is such that the pinion 27 will be rotated one revolution each time one of the sets of teeth meshes with the pinion.

The multiplated gear 28 carries two upstanding pins 31, each of which is adapted to engage the long arm 32 of a spring coiled at 33 about the sleeve shaft 22 and having an extension 33', resting on an abutment 5a. The function of this spring is to tend to turn the mutilated gear 28 in the direction shown by the arrow, so that one of the teeth 34 of a tooth-section 29 may be brought into engagement with a stop member 35.

This stop member is carried by the sleeve shaft 19, the lower end of which is provided with a yoke 37, having spaced arms 38, engaging each side of an upstanding flange 39, which forms a part of a lever 40.

As shown in Fig. 3, the lever 40 is pivoted at 41 to the magazine body and a spring 42 normally thrusts the lever 40 in the direction shown by the arrow, in which direction an arm 43 of the lever, which carries a film aperture-engaging member 44, may be normally moved against the direction of movement of the film F, as shown by the arrows in Figs. 4 and 5.

In addition, the tension on the lever arm 40 is such that it tends to thrust the film-engaging member 44 in the direction of the arrows shown in Figs. 4 and 5, which is against the surface of the film F, so that when a film aperture A is moved, the engaging end 44 will immediately enter the aperture.

With the film-engaging member 44 in the position shown in Fig. 4, which is the position it assumes as soon as an aperture A reaches the engaging member, it is obvious that movement of the film in the direction of the arrow will swing the lever 40 upon its pivot 41. This movement causes the yoke 37 to swing in a counterclockwise direction with reference to Fig. 2, moving the stop member 35 away from the gear tooth 34 and permitting the spring 32, through its pressure against the stud 31, to engage the gear teeth 29 with the pinions 23 and 27. This engagement will prevent further movement of the winding handle 11, because it will connect the film winding shaft 24 with the already set shutter setting member 55, as will be hereinafter more fully described. When the parts reach the position shown in Fig. 7, the handle 11 is locked against winding and at the same time, the arm 43 of the lever is released so that it may return toward the position shown in Fig. 4 as soon as a mutilated portion 30 of the gear permits it to do so.

The shutter is of the type shown in my copending application which consists of a curtain supporting roller and a pair of curtain supporting spools, designated broadly herein as 50 in Fig. 1, from which a front curtain 51 and a rear curtain 52 pass in front of the exposure frame 2 and are wound upon their spring drums 53 and 54.

In order to wind the curtains to set their respective springs for an exposure, the cam 55, which has a single tooth 56, is rotated one revolution, this single revolution causing the latch 57, which is carried by a stud 58 on the disk 59, to turn one revolution or approximately 360°.

Fig. 10 shows the tail 60 of this latch engaged by an arm 61 of a lever 62 in the position it assumes just as the shutter is released. The parts move from the position shown in Fig. 10 until the pin 58 engages the opposite side of an upstanding lug 63 on the arm 64, moving the arm until the slot 65 engages the pin 66, thus coming to an unwound position of rest.

In order to turn the cam 55, the shaft 67 is turned and this shaft may be turned in one direction only because of a ratchet 68 which is engaged by a pawl (not shown). The ratchet is attached to the shaft 67 forming a part of the shutter mechanism shown in my above mentioned copending application. The shaft 67 likewise carries a slotted disk 70, best shown in Fig. 3, which engages a key 71, carried on the shaft 72, which supports the pinion 27. Thus, when the pinion 27 is turned, the cam 55 will be turned, and since a spring 73 presses the latch 57 into engagement with the tooth 56 of the cam, as soon as an exposure is made, the latch elements 56 and 57 will be brought into engagement. This engagement is permitted because the lever 62, which is pivoted at 75, is pressed by a spring 76 in the direction shown by the arrow. The trigger member for releasing the shutter is a button (not shown), which is connected at 77 to a lever 78 which is attached to the rod 79, the other end of which is attached to the lever 62, all as shown in my above mentioned application. When member 77 is depressed, member 78 draws lever 62 against its spring 76 so that the arm 61 may move the end 60, disengaging the latch 57, 56.

In its position of rest, the latch elements 57 and 56 are engaged. Consequently, an exposure having been made, the next movement is to wind the film and set the shutter. This is accomplished by oscillating the handle 11 so that the movements of the crown gear 15 may transmit movement through gears 18, 20 and 21 to the film winding shaft or spool 10.

Movement is also transmitted to the gear 23 which is in the position shown in Fig. 7, so that as pinion 23 turns, it turns the toothed section 29 of the mutilated gear 28. Since both toothed sections of the mutilated gear are alike, the pinion 27 will be turned exactly one revolution before the mutilated gear reaches the position shown in Fig. 2.

As soon as the stop member 35 rides off the end of the teeth, it will drop down into the mutilated area 30 and catch the first tooth 34, as shown in Fig. 2, as the gear 23 is being moved by the spring 32. When this occurs, the driving handle 11 is disconnected entirely from the shutter setting member 55, because the shutter winding shaft has made its single revolution and because the pin 58 comes to rest against the limiting stop 63, so that the shutter is not only wound, but it is latched in its wound position. This latching occurs through the latch elements 56, 57.

However, at this stage of the operation, the film winding is not yet complete. Since the winding handle has been disconnected from the film wind control gears, further movement of the handle 11 merely drives the take-up spool 10 through the gears 18, 20 and 21 and pinion 23 moves idly in the mutilated area 30 of the gear 28.

In order to stop the winding at the proper point, the winding handle 11 is locked by connecting up the handle with the locked shutter setting lever, this occurring as an aperture A approaches the aperture-engaging member 44 of lever 40, as indicated in Fig. 4, rocking the lever about its pivot 41 so as to move the stop 35 away from the gear 28 a sufficient distance to permit the spring 32 to engage the teeth sections 29 with the pinions 23 and 27. The pinion 27 cannot move because the pin 58 has engaged the stop member 63, and consequently, the meshing of these teeth immediately prevents further movement of the winding handle 11. The film has now been wound and the shutter set.

It is necessary to disengage the lever 40 from the film aperture A, and this is accomplished in the following manner: The arm 43 is provided with a cam surface 80 which is so shaped that it may engage the fixed projection 81 of the camera frame 5. Thus, as the film moves from the position shown in Fig. 4 to the position shown in Fig. 5, the arm 43 will be cammed by members 80 and 81 out of the film aperture A, so that the film winding may continue the very short distance which permits the stop 35 to move away from the mutilated gears and the teeth of the mutilated gear and the pinions 23 and 27 to mesh. The spring 42 may then move the aperture-engaging member 44 to substantially the same position shown in Fig. 4, except that the end of member 44 will ride on the face of the film until another aperture comes into a position which permits it to move to the position shown in Fig. 4, in which it projects through the aperture.

With this construction, it will be seen that the film winding handle may be freely turned entirely without attention from an operator until the shutter is set and continued movement winds a fresh area of film into place. This operation can only take place, of course, if the shutter has first been actuated, so that there is no possibility for double exposures to be made. It should be particularly noted that with this arrangement of parts, the film wound is controlled by cut-outs in the film, and when the proper area of film has been wound, it is locked against the shutter setting member. This is desirable because as soon as an exposure is made, the shutter setting member is moved to a different position, so that the film winding lever is no longer locked and may be again turned.

I claim:

1. In a camera including an exposure frame, spool chambers to each side thereof, the combination with a film winding shaft, of a shutter winding shaft, a winding handle, movable connections between the two shafts and the winding handle for simultaneously winding film and setting the shutter, a film measuring device comprising a pivoted arm, a lug on the arm adapted to engage a film aperture, a spring tending to move the lug toward the film aperture and into engagement therewith, means for releasing the lug from the film through movement of the arm by the film, a stop normally lying in the path of the movable connections between the winding shaft and the shutter setting shaft and movable from its normal position by said arm, a spring for operatively engaging said connections when said stop is moved for preventing further movement of the film winding shaft while the shutter setting shaft is wound.

2. In a camera having a shutter of the setting type, and a setting member movable through a fixed path against a stop for setting the shutter, said camera including a camera body, an exposure frame and spool chambers therein, the combination with a film winding shaft extending into one spool chamber, gearing for turning said shaft and setting said shutter by moving the setting member through its fixed path, gearing for locking the film winding shaft including spaced pinions and a gear having mutilated portions and positioned to mesh with both pinions, means tending to turn the mutilated gear in one direction, a stop opposing said movement and means actuated by the film and connected to the stop for moving said stop to mesh teeth of the mutilated gear with the pinions.

3. In a camera having a shutter of the setting type, and a setting member movable through a fixed path against a stop for setting the shutter, said camera including a camera body, an exposure frame and spool chambers therein, the combination with a film winding shaft extending into one spool, chamber, gearing for turning said shaft, and setting said shutter by moving the setting member through its fixed path, gearing for locking the film winding shaft including spaced pinions and a gear having mutilated portions and positioned to mesh with both pinions, means tending to turn the mutilated gear in one direction, a stop mounted to move into the path of the mutilated gear to hold said gear against movement, a lever operably connected to the stop and actuated by the film for moving the stop from its gear holding position whereby said gear may connect said pinions and block movement of the winding shaft by connecting the film winding shaft to the shutter setting member.

4. In a camera having a shutter of the setting type, and a setting member movable through a fixed path against a stop for setting the shutter, said camera including a camera body, an exposure frame and spool chambers therein, the combination with a film winding shaft extending into one spool, chamber, gearing for turning said shaft, and setting said shutter by moving the setting member through its fixed path, gearing for locking the film winding shaft including spaced pinions and a gear having mutilated portions and positioned to mesh with both pinions, means tending to turn the mutilated gear in one direction, a stop member, a pivotal mount for the stop member, a lever carried by the pivotal mount, a second lever for actuating the stop through the first lever, means for actuating the second lever by the film, said stop member being adapted to lie in the path of the mutilated gear to hold it against movement and when moved by the film to release it whereby said spring may turn the mutilated gear into mesh with both pinions preventing further operation of the film until said shutter is released.

5. In a camera having a shutter of the setting type, and a setting member movable through a fixed path against a stop for setting the shutter, said camera including a camera body, an exposure frame and spool chambers therein, adapted to receive film having a cutout therein spaced one for each exposure, the combination with a film winding shaft extending into a film winding chamber, a handle pivotally mounted on the camera, a gear drive connecting the handle and film winding shaft, a second gearing comprising pinions and a mutilated gear adapted to mesh with the pinions, one pinion turning with the winding key shaft and the other interconnected to the shutter setting member, whereby movement of the handle may wind film and set the shutter, the proportion of the said pinions to the mutilated gear being such that the latter may set the shutter before the pinions are disconnected, and means under the control of a film cut out for remeshing the pinions and mutilated gear by turning the gear whereby further operation of the film wind is prevented by the set shutter.

6. In a camera having a shutter of the setting type and including a disk adapted to be turned to set the shutter, a camera body, an exposure frame carried thereby, and spool chambers spaced to each side thereof, the combination with a film winding mechanism comprising a manually operable handle, gearing connected to the handle, of a film winding shaft connected to the gearing, said shutter disk being also connected to the gearing, means for winding the film and shutter together, including the handle and gearing, a gear having two spaced mutilated portions, two pinions mounted to mesh with the mutilated gear, one connected to the film wind shaft, the other connected to the gearing operable by the handle, a spring tending to turn the mutilated gear, a stop for holding the mutilated gear with the mutilated portions opposite said pinions, and means connected to the stop and operable by the film for moving the stop whereby the spring may move the mutilated gear into mesh with said pinions.

7. In a camera including an exposure frame, spool chambers to each side of the exposure frame adapted to contain film and an objective, a shutter of the type requiring setting and including a setting member; the combination with a winding handle, of two sets of gearing between the winding handle and film winding shaft, one set of gearing for winding film by the film winding shaft, the other set of gearing including two pinions connected by a mutilated gear one pinion connected to the film winding shaft and the other pinion connected to the shutter setting member, the teeth of the gear and pinion being selected to turn the pinion connected to the shutter setting member one revolution before it is released by a mutilated gear portion, said shutter setting member being adapted to be set through one revolution of said pinion connected thereto, an arm lying adjacent and positioned to engage the film, and a mutilated gear control including said arm operable through the film for reengaging the mutilated gear and pinions by turning the gear to prevent further winding of the handle for winding film.

8. In a camera including an exposure frame, spool chambers to each side of the exposure frame adapted to contain film and an objective, the combination with a winding handle, of two sets of gearing between the winding handle and film winding shaft, one set of gearing for winding film by the film winding shaft, the other set of gearing including two pinions connected by a mutilated gear, the teeth of the gear and pinion being selected to turn one pinion one revolution before it is released by a mutilated gear portion, a shutter setting member adapted to be set thru one revolution of said pinion, and a pivoted stop positioned to engage mutilated gear and hold said gear with the teeth out of mesh with the pinions, a spring tending to turn the mutilated gear to engage the mutilated gear teeth and pinions, and a stop operating device including a member engageable with the film for moving the stop when an area of film has been wound into place whereby the mutilated gear and pinion teeth may mesh and prevent further winding while the shutter is set.

9. In a camera including an exposure frame, spool chambers to each side of the exposure frame adapted to contain film with an aperture for each exposure and an objective, the combination with a winding handle, of two sets of gearing between the winding handle and film winding shaft, one set of gearing for winding film by the film winding shaft, the other set of gearing including two pinions connected by a mutilated gear, the teeth of the gear and pinion being selected to turn one pinion one revolution before it is released by a mutilated gear portion, a shutter setting member adapted to be set thru one revolution of said pinion, and a pivoted stop positioned to engage the mutilated gear and hold said gear with the teeth out of mesh with the pinions, a spring tending to turn the mutilated gear to engage the mutilated gear teeth and pinions, and a stop operating device including a movable member positioned to engage and be moved by a film aperture for moving the stop when an area of film has been wound into place whereby the mutilated gear and pinion teeth may mesh and prevent further winding while the shutter is set.

10. In a camera including an exposure frame, spool chambers to each side of the exposure frame adapted to contain film with an aperture for each exposure and an objective, the combination with a winding handle, of two sets of gearing between the winding handle and film winding shaft, one set of gearing for winding film by the film winding shaft, the other set of gearing including two pinions connected by a mutilated gear, the teeth of the gear and pinion being selected to turn one pinion one revolution before it is released by a mutilated gear portion, a shutter setting member adapted to be set thru one revolution of said pinion, and a pivoted stop positioned to engage the mutilated gear and hold said gear with the teeth out of mesh with the pinions, a spring tending to turn the mutilated gear to engage the mutilated gear teeth and pinions, and a stop operating device including a movable member positioned to engage and be moved by a film aperture for moving the stop when an area of film has been wound into place, whereby the mutilated gear and pinion teeth may mesh and prevent further winding while the shutter is set, the movable member positioned to engage the film including a cam, a cam engaging member on the camera body adapted to engage the cam removing the movable member from the film as it is moved by the film in moving the stop, a spring for moving the movable member in a direction opposite to that in which the film moves, whereby said movable member may be moved back against the film by its spring after the stop has been moved and the mutilated gear and pinions meshed.

JOSEPH MIHALYI.